(12) United States Patent
Shuck et al.

(10) Patent No.: US 12,233,471 B2
(45) Date of Patent: Feb. 25, 2025

(54) TECHNIQUES FOR FORMING COMPOSITE SANDWICH STRUCTURES

(71) Applicant: Rolls-Royce Corporation, Indianapolis, IN (US)

(72) Inventors: Quinlan Yee Shuck, Indianapolis, IN (US); Timothy Paul Fuesting, Indianapolis, IN (US); Scott Nelson, Indianapolis, IN (US); Raymond Ruiwen Xu, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 741 days.

(21) Appl. No.: 17/537,803

(22) Filed: Nov. 30, 2021

(65) Prior Publication Data

US 2022/0193810 A1    Jun. 23, 2022

Related U.S. Application Data

(60) Provisional application No. 63/126,952, filed on Dec. 17, 2020.

(51) Int. Cl.
*B23K 11/00* (2006.01)
*B21D 47/00* (2006.01)
(Continued)

(52) U.S. Cl.
CPC .......... *B23K 11/0093* (2013.01); *B21D 47/00* (2013.01); *B23K 11/115* (2013.01);
(Continued)

(58) Field of Classification Search
CPC ..... B23K 1/0014; B23K 11/115; B23K 11/34; B23K 26/244; B23K 1/19; B23K 11/002; B23K 11/0093; B23K 15/0046; B23K 2101/02; B23K 2101/18; B23K 2103/14; B23K 2103/16; B23K 26/26; B23K 26/28; B23K 26/32; B23K 31/02; B23K 35/007; B23K 35/0238; B23K 35/30; B23K 1/0008; B23K 1/008; B23K 1/20; B23K 1/206;
(Continued)

(56) References Cited

U.S. PATENT DOCUMENTS

| | | | |
|---|---|---|---|
| 2,163,590 | A | 6/1939 | De Ganahl et al. |
| 2,944,504 | A | 7/1960 | Herman et al. |

(Continued)

*Primary Examiner* — Chris Q Liu
(74) *Attorney, Agent, or Firm* — Shumaker & Sieffert, P.A.

(57) ABSTRACT

In some examples, a technique including positioning supports such that the supports are between a first metallic substrate and a second metallic substrate, wherein an undulating member is located between the first metallic substrate and the second metallic substrate, the undulating member defining a plurality of first peaks adjacent to a first surface of the first metallic substrate and a plurality of second peaks adjacent to a second surface of the second metallic substrate, wherein a first support of the supports is positioned such that the first support extends between a first peak of the plurality of first peaks and the second surface of the second metallic substrate; welding the first peak to the first surface of the first metallic substrate in an area of the first support; and removing the first support by at least one of a thermal removal process or a chemical removal process.

14 Claims, 3 Drawing Sheets

(51) Int. Cl.
  *B23K 11/11* (2006.01)
  *B23K 15/00* (2006.01)
  *B23K 26/22* (2006.01)
  *B23K 101/02* (2006.01)

(52) U.S. Cl.
  CPC ........ *B23K 15/0006* (2013.01); *B23K 15/008* (2013.01); *B23K 26/22* (2013.01); *B23K 2101/02* (2018.08)

(58) Field of Classification Search
  CPC ...... B23K 10/02; B23K 11/02; B23K 11/061; B23K 11/16; B23K 11/166; B23K 11/20; B23K 11/36; B23K 11/362; B23K 15/0006; B23K 15/006; B23K 15/008; B23K 20/021; B23K 20/08; B23K 20/16; B23K 20/2333; B23K 2101/001; B23K 2101/34; B23K 2103/04; B23K 2103/08; B23K 2103/10; B23K 2103/12; B23K 2103/172; B23K 2103/18; B23K 2103/20; B23K 2103/50; B23K 26/037; B23K 26/123; B23K 26/206; B23K 26/21; B23K 26/22; B23K 26/323; B23K 26/38; B23K 26/60; B23K 26/702; B23K 35/001; B23K 35/004; B23K 35/0222; B23K 35/0244; B23K 35/025; B23K 35/0255; B23K 35/24; B23K 35/262; B23K 35/28; B23K 35/3006; B23K 35/302; B23K 35/3033; B23K 35/32; B23K 35/325; B23K 9/167; B23K 9/232; B23K 9/235
  USPC ............ 219/78.12, 104, 117, 1, 118, 121.12, 219/121.14, 121.64, 78.11, 82, 91.2
  See application file for complete search history.

(56) References Cited

U.S. PATENT DOCUMENTS

| | | |
|---|---|---|
| 3,612,813 A | 10/1971 | Gerath |
| 5,007,225 A * | 4/1991 | Teasdale .................. E04C 2/34 52/783.17 |
| 5,330,092 A | 7/1994 | Gregg et al. |
| 6,656,603 B2 | 12/2003 | Buldhaupt et al. |
| 8,426,762 B2 | 4/2013 | Kuchuk-Yatsenko et al. |
| 8,951,376 B2 | 2/2015 | Rasmussen |
| 9,126,387 B2 | 9/2015 | Straza et al. |
| 2004/0020162 A1* | 2/2004 | Baratuci ............. E06B 3/66309 52/786.13 |
| 2005/0247678 A1* | 11/2005 | Wang .................. B23K 11/166 219/121.64 |
| 2009/0032110 A1* | 2/2009 | Straza ..................... F28F 13/06 137/1 |
| 2009/0136824 A1* | 5/2009 | Takagi .................. H01M 8/242 228/176 |
| 2009/0282773 A1* | 11/2009 | Queheillalt ............. B21C 23/14 156/154 |
| 2009/0286100 A1* | 11/2009 | Wadley .................. B21D 47/00 29/897.31 |
| 2010/0297468 A1* | 11/2010 | Hecht ..................... F01D 5/025 228/256 |
| 2011/0188927 A1* | 8/2011 | Mizrahi .................. B32B 27/36 219/118 |
| 2014/0191142 A1* | 7/2014 | Frayssines ........... B23K 20/021 250/517.1 |
| 2016/0116227 A1* | 4/2016 | Yamada .................. B23K 1/19 165/10 |
| 2016/0348249 A1* | 12/2016 | Lin ......................... C23C 26/00 |
| 2020/0198293 A1* | 6/2020 | Peck ........................ B32B 5/26 |

* cited by examiner

TECHNIQUES FORMING COMPOSITE SANDWICH STRUCTURES

This application claims the benefit of U.S. Provisional Patent Application No. 63/126,952, filed Dec. 17, 2020, the entire content of which is incorporated by reference herein.

TECHNICAL FIELD

The present disclosure generally relates to composite sandwich structures, e.g., for use in aerospace applications.

BACKGROUND

Composite sandwich structure may be employed in a variety of aerospace applications, e.g., to form structural components of a high temperature gas turbine engine or flight control surface. The composite structure may include two substrates (or skins) separated by and bonded to a core support structure. The substrates and core support structure may be selected based on the desired application and properties for the composite structure. In some examples, the two substrates may be relatively thin and the core support structure may be relatively thick. The core support structure may take the form of a honeycomb core that provides for relatively high strength to weight ratio of the composite sandwich structure.

SUMMARY

In some examples, the disclosure describes a method that includes positioning a plurality of supports such that the plurality of supports are between a first metallic substrate and a second metallic substrate, wherein an undulating member is located between the first metallic substrate and the second metallic substrate, the undulating member defining a plurality of first peaks adjacent to a first surface of the first metallic substrate and a plurality of second peaks adjacent to a second surface of the second metallic substrate, wherein a first support of the plurality of supports is positioned such that the first support extends between a first peak of the plurality of first peaks and the second surface of the second metallic substrate; welding the first peak to the first surface of the first metallic substrate in an area of the first support; and removing the first support by at least one of a thermal removal process or a chemical removal process.

The details of one or more examples are set forth in the accompanying drawings and the description below. Other features, objects, and advantages will be apparent from the description and drawings, and from the claims.

DETAILED DESCRIPTION

The disclosure describes techniques for making composite sandwich structures and composite sandwich structures made using such techniques. The composite sandwich structures made using the example techniques may be employed to form components in aerospace applications. The composite structures may exhibit low thermal conductivity, e.g., for heat shielding applications, and/or high strength to weight ratio, e.g., for high strength structural applications. In some examples, the composite sandwich structure may be used to form portions of high temperature gas turbine engines components, such as exhaust gas structures, engine casings, combustors, combustor casings, brackets (e.g., L-brackets), vane structures, structural heat shields, heat exchangers, and/or structures that define flight surface of an aircraft, such as wings, fins, and flight control surfaces.

Composite sandwich structures may include two substrates (or skins) separated by a core support structure. The core support structure may be a honeycomb structure that contacts the adjacent substrates. In some examples, the honeycomb structure may be attached to the adjacent substrates by brazing the portions of the honeycomb structure in contact with the adjacent substrates. However, when employed in a gas turbine engine or other system that operates in high temperature environments, the composite sandwich structure may be subjected to temperatures above the temperature limits of the braze material causing the braze joints attaching the substrates to the honeycomb structure to degrade and possibly fail.

In accordance with examples of the disclosure, techniques may be employed in which an undulating core support member (also referred to as an undulating member or core member) is welded to first and second substrates to form a composite sandwich structure. To assist in the welding process, a plurality of supports may be positioned in gaps between peaks in the undulating core member and adjacent substrates, e.g., so that the support members extend in the gaps from one of the substrates to the other substrate with the peak of the undulating core member being in contact with at least one of the substrates and undulating core member. In some examples, the supports may allow for resistance welding between the core member and substrates by allowing current to flow between the core member and first and second substrates via the supports. Additionally, or alternatively, the supports may be used to provide structural support or backing for other types of welding processes, such as, electron beam welding or laser welding. After the welding process is complete, the supports may be removed from the composite sandwich structure by a thermal removal process (e.g., by melting the solid supports and allowing the liquid support material to flow out of the composite sandwich structure) and/or a chemical removal process (e.g., by leaching the supports in acid and/or electroplating the supports to a component outside the composite sandwich structure. In this manner, the supports may be used during the welding process and subsequently removed after welding even in cases in which the internal lattice structure of the resulting composite sandwich structure does not allow for the supports to be physically removed, e.g., because the supports, in solid form, are larger than the openings in the lattice structure.

Figure 1:
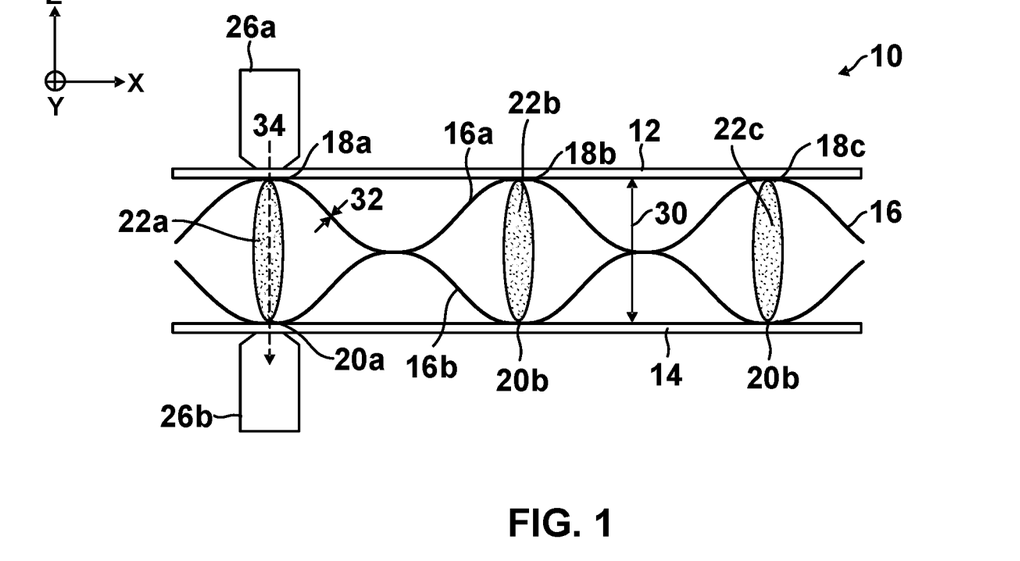
FIG. 1 is a conceptual block diagram illustrating the cross-section of an example composite sandwich structure.

FIG. 1 is a schematic diagram illustrating the cross-section of an example composite sandwich structure 10 in accordance with examples of the disclosure. As shown, composite structure 10 includes first substrate 12, second substrate 14, and undulating core member 16. Undulating core member 16 is positioned between first substrate 12 and second substrate 14.

First substrate 12, second substrate 14, and undulating core member 16 may have any suitable composition that allows for the respective components to be welded to each other as described herein. The composition of first substrate 12, second substrate 14, and undulating core member 16 may be the same or different from one another, for example, with first substrate 12, second substrate 14, and undulating core member 16 all having different compositions or undulating core member 16 having a different composition than first substrate 12 and second substrate 14.

First substrate 12 and second substrate 14 may be formed a material suitable for use in a high-temperature environment. In some examples, first substrate 12 and second substrate 14 may be metallic substrates formed of a metal or metal alloy. In some examples, first substrate 12 and second substrate 14 may include of a superalloy including, for example, an alloy based on Ni, Co, Ni/Fe, or the like. In examples in which substrate 12 includes a superalloy material, substrate 12 may also include one or more additives such as titanium (Ti), cobalt (Co), or aluminum (Al), which may improve the mechanical properties of substrate 12 including, for example, toughness, hardness, temperature stability, corrosion resistance, oxidation resistance, or the like. In some examples, substrate 12 includes titanium alloys, refractory metals/alloys, aluminum alloys, and/or intermetallic alloys such as aluminides.

In some examples, first substrate 12 and/or second substrate 14 may exhibit relatively high strength and/or relatively high stiffness. Additionally, or alternatively, first substrate 12 and/or second substrate 14 may be exhibit low thermal conductivity, e.g., where composite structure 10 is employed as a heat shield or other thermal barrier. Such properties may result from the composition and geometry of first substrate 12 and second substrate 14. As noted above, first substrate 12 and second substrate 14 may also be a material that is weldable to undulating member 16 in the manner described herein.

First substrate 12 and second substrate 14 may have any suitable thickness (e.g., in the Z-direction labelled in FIG. 1). The thickness of first substrate 12 and second substrate 14 may be the same or different from each other. First substrate 12 and/or second substrate 14 may be relatively thin in some examples to allow for a relatively high strength to weight ratio in some applications. In some examples, first substrate 12 and second substrate 14 may have a thickness that is less than the width of gap 30 between first substrate 12 and second substrate 14 that undulating member 16 extends therein. In some examples, first substrate 12 and second substrate 14 may have a thickness of at least about 1 mil, such as about 5 mils to about 250 mils depending on the material. Other values are contemplated.

As shown in FIG. 1, rather than define a unitary continuous core in gap 30 between first and second substrates 12, 14 such that there is substantially continuous contact between the core and substrates, undulating core member 16 defines a plurality of first peaks 18a-18c (collectively "first peaks 18") adjacent to the opposing surface (bottom surface) of first substrate 12 such that discrete portions of undulating core member 16 are in contact with the opposing surface of first substrate 12. Likewise, undulating core member 16 defines a plurality of second peaks 20a-20c (collectively "second peaks 20") adjacent to the opposing surface (top surface) of second substrate 14 such that discrete portions of undulating core member 16 are in contact with the opposing surface of second substrate 14. As will be described further below, first substrate 12 may be attached to undulating member 16 at first peaks 18 via weld joints and, similarly, second substrate 14 may be attached to undulating member 16 at second peaks 20 via weld joints.

As described herein, in some examples, undulating member 16 may be configured such that, when attached between first substrate 12 and second substrate 14, composite structure 10 exhibits one or more desired properties, e.g., that would not be exhibited by first substrate 12 or second substrate 14 individually, or by a composite structure formed by directly attaching first substrate 12 and second substrate 14 to each other. In some examples, undulating member 16 may be configured such that, when attached between first substrate 12 and second substrate 14, composite structure 10 exhibits a relatively high strength/stiffness to weight ratio, e.g., as compared to if first substrate 12 and second substrate 14 were directly attached to each other. The strength to weigh ratio may be increased or otherwise higher than first substrate 12 or second substrate 14 individually, e.g., by undulating member 16 transferring force between first substrate 12 and second substrate 14 while also being low weight due to the open spaces or voids in composite structure 10 between first substrate 12 and second substrate 14. In some examples, undulating member 16 may be configured such that, when attached between first substrate 12 and second substrate 14, composite structure 10 exhibits a relatively low thermal conductivity, e.g., as compared to if first substrate 12 and second substrate 14 were directly attached to each other. The thermal conductivity of composite structure 10 may be relatively low due to the open spaces or voids in composite structure 10 between first substrate 12 and second substrate 14 and/or the materials selected for first substrate 12, second substrate 14, and undulating member 16. In some examples, composite structure 10 may be configured such that a cooling fluid flows in the open spaces defined by undulating member 16 in gap 30 between first substrate 12 and second substrate 14 for heat transfer purposes.

Figure 3:
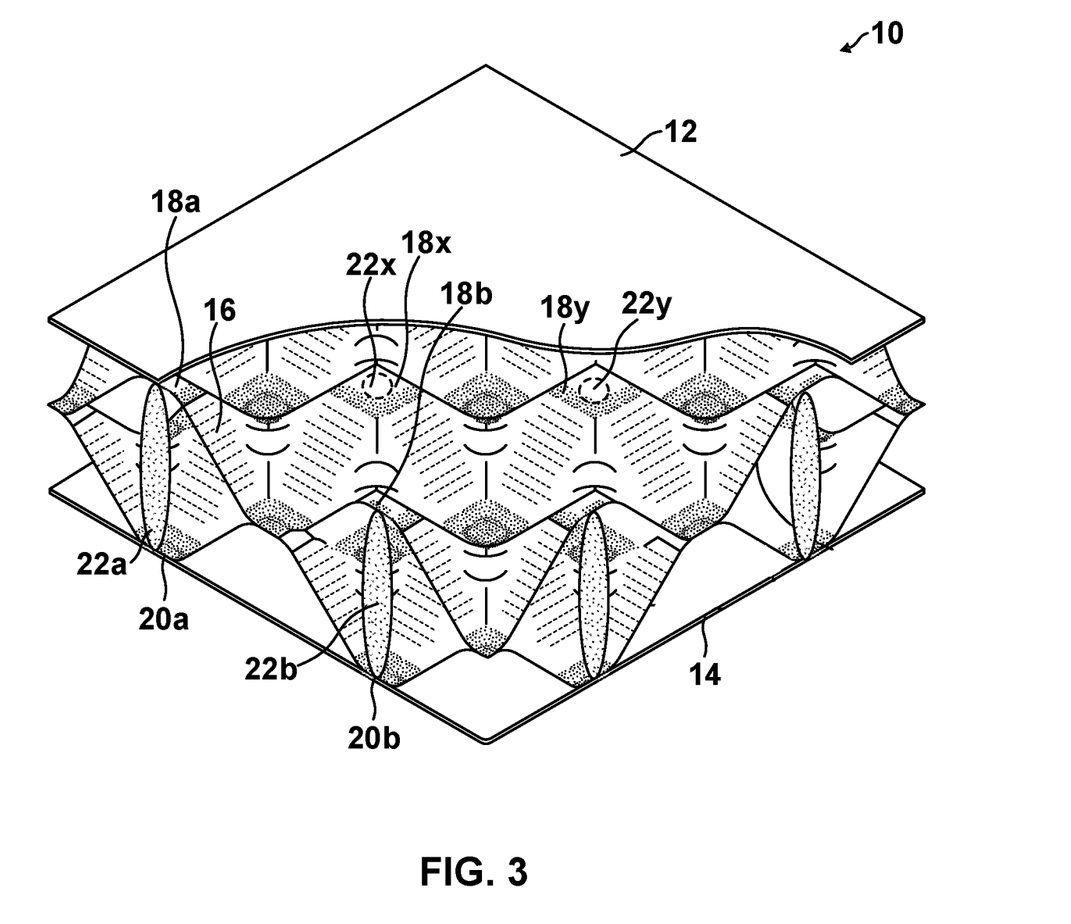
FIG. 3 is a conceptual diagram illustrating an example composite sandwich structure having a cross-section such as that shown in FIG. 1.

Undulating core member 16 may have any suitable geometry. In some examples, undulating core member 16 may be in a corrugated configuration in which first peaks 18 and second peaks 20 extend in a substantially linear fashion in one or more directions, e.g., along the y-direction indicated in FIG. 1. In other examples, undulating core member 16 may have an egg crate configuration in which first peaks 18 and second peaks 20 are at discrete positions along the x-y plane show in FIG. 1. FIG. 3 illustrates an example in which the core member 16 has an egg crate configuration. The example of FIG. 1 shows undulating member 16 having a curvilinear configuration defining peaks 18 and 20, e.g., where undulating member 16 is the combination of two sinusoidal-type waves stacked on each other as shown in FIG. 1. In such a case, the peaks 18 and 20 may be defined by "half domes" in the case of an egg crate configuration. In other examples, undulating member may have a substantially linear configuration, e.g., in which peaks 18 and 20 are defined by discrete points defining the apex of the peaks. While peaks 18 and 20 of undulating member 16 are regularly spaced in FIG. 1, in other example, peaks 18 and 20 may be unevenly distributed in the area between first substrate 12 and second substrate 14.

Undulating core member 16 may be formed of a metallic material or other material that allows for core member 16 to be welded to first substrate 12 and second substrate 14 as described herein. In some examples, undulating core member 16 includes at least one metal or alloy. The composition of undulating core member may be substantially the same or different than first substrate 12 and/or second substrate 14. In some examples, undulating member 16 may be formed of an electrically conductive material, e.g., to allows for a current to be conducted along path 34 during a resistant welding process such as that described below.

Undulating member 16 may have any suitable thickness 32. In some examples, thickness 32 may be at least about 0.5 mils such as about 1 mil to about 125 mils. In some examples, thickness 32 is substantially constant for undulating member 16 while in other examples thickness 32 may vary. Gap 30 may be at least about 4 mils, such as, about 8 mils to about one inch. Other values are contemplated.

Undulating member 16 may be formed using any suitable technique. For example, in the example of FIGS. 1, undulating support member 16 may be formed of two undulating sheets 16a and 16b of material that may be combined (e.g., stacked and attached to each other) to form undulating member 16. In some examples, undulating members 16a and 16b may be flat sheets that are first stamped or cast to define the desired undulating shapes and then attached to each other, e.g., in the configuration shown in FIG. 1, by welding or other suitable attachment technique. In other examples, such as that shown in FIGS. 4 and 5, undulating member 16 may be formed of a single sheet that is stamped or cast to the desired shape, or more than two sheets, such as three or more sheets stacked in a manner similar to that of the example of FIG. 1. Alternatively, or additionally, all or a portion of undulating member 16 may be formed by an additive manufacturing process.

As shown in FIG. 1, composite structure 10 also includes supports 22a-22c (collectively supports 22) positioned in gap 30 between first substrate 12 and second substrate 14 adjacent to first peaks 18 and first peaks 20. For example, support 22a extends from the bottom surface of first peak 18a to the top surface of second peak 20a, with the top surface of undulating member 16 at first peak 18a being in contact with the bottom surface of first substrate 12 and, similarly, with the bottom surface of undulating member 16 at second peak 20a being in contact with the top surface of second substrate 14.

Supports 22 may allow or otherwise assist in a process that welds first peaks 18 to first substrate 12 and second peaks 20 to second substrate 14 to attach first substrate 12 to second substrate 14 via undulating member 16. For example, as described below, supports 22 may allow for resistance welding between first peaks 18 and first substrate and, likewise, between second peaks 20 and second substrate 14 but allowing for a current to be conducted through supports 22. For purposes of illustration, electrodes 26a and 26b are shown in FIG. 1 with an electrical current being conducted along path 34, e.g., as may take place in a resistance welding process. The current and resistance during such a process may heat first peak 18a and/or first substrate 12 a sufficient amount to melt first peak 18a and/or first substrate 12 so that a weld in formed in the area where first peak 18a contacts first substrate 12. The current and resistance during such a process may also heat second peak 20a and/or second substrate 14 a sufficient amount to melt second peak 20a and/or second substrate 14 so that a weld in formed in the area where second peak 20a contacts second substrate 14. Such a process may be carried out at the location of supports 22b and 22c to form similar resistance welds.

Additionally, or alternatively, supports 22 may provide structural support during a welding process. For example, during a resistance welding process such as that described herein, supports 22 may allow for a force to be applied between first and second substrates 12 and 14 in the area of supports 22 so that contact between undulating member 16 and first and second substrates 12 and 14 in the area of peaks 18 and 20, respectively, is maintained during the weld process to provide for a desirable weld. Supports 22 may function in such a manner (e.g., as a backing in gap 30) during other welding processes, such as, e.g., electron beam welding or laser welding.

Supports 22 may be formed of any suitable material. Example materials may include copper, nickel, molybdenum, and/or aluminum. For those reasons identified herein, supports 22 may be formed of a different material from that of undulating member 16, first substrate 12 and second substrate 14. The material used for supports 22 may be dependent on the type of welding process used to form the weld between undulating member 16 and first and second substrates 12 and 14. In some examples, supports 22 may be formed of an electrically conductive material such as copper may be used for a resistance welding process, e.g., to conduct a current from electrode 26a to electrode 26b along path 34 shown in FIG. 1.

As described herein, following the welding process that welds undulating member 16 to first and second substrate 12 and 14, supports 22 may be removed using a thermal removal process and/or a chemical removal process. Example removal processes may include leaching or other chemical dissolution (e.g., in an acid) of supports 22, melting supports 22 so that the liquid material may flow out of composite structure 10 (e.g., out of open spaces in gap 30), and/or removal of support 22 by electroplating the material to a surface external to composite structure 10. Thus, supports 22 may be formed of a material selected to allow for the desired removal process. For leaching or other chemical dissolution to remove supports 22, supports 22 may be formed of copper, nickel, molybdenum, aluminum, iron, or other material that may be chemically removed in such a manner without breaking the welds formed between undulating member 16 and first and second substrates 12 and 14 (and/or without chemically removing the material of undulating member 16, first substrate 12, and/or second substrate 14 during the support removal process). For a thermal removal process to remove supports 22, supports 22 may be formed of copper, nickel, aluminum or other material that has a melting temperature less than that of undulating member 16 and first and second substrates 12 and 14. For an electroplating process to remove supports 22, supports 22 may be formed of copper, nickel, iron or other material that allows for such electroplating without also electroplating the materials of undulating member 16 and first and second substrates 12 and 14.

Supports 22 may have any suitable shape and size that allow for the techniques described herein. Each individual support of the plurality of supports 22 may have the same or substantially similar size and shape, while in other examples, the size and shape of the individual supports may differ, e.g., in cases in which the geometry of undulating member 16 between the respective peaks 18 and 20 differs. In the example of FIG. 1, supports has an elongated oval-like shape. In other examples, the shape of supports 22 may be approximately cylindrical, e.g., as a cylindrical post type support. Supports 22 may only occupied a portion of the open or void volume defined by undulating member 16 between first and second substrates 12 and 14, e.g., rather than filling the entire open or void volume during the welding process. In this manner, less material must be removed after the welding process. Support 22 may be designed to deform under load to promote intimate contact with the opposing support surfaces, e.g., the adjacent portion of undulating member 16 or substrates 12, 14. In still other examples, supports 22 may be sized and shaped to substantially fill the open or void volume defined by undulating member 16 between first and second substrates 12 and 14.

FIG. 3 is a perspective view of an example composite sandwich structure 10 in accordance with examples of the disclosure with supports still positioned in place for welding and prior to removal using a thermal and/or chemical removal process. Composite structure 10 is an example structure having a cross-section like that shown in FIG. 1, and like features are similarly numbered. For purposes of illustration, a portion of first substrate 12 has been removed to show the egg-crate like configuration of undulating member 16 between first and second substrates 12 and 14. As shown, support 22a in positioned between first peak 18a and second peak 20a, and support 22b is positioned between first peak 18b and second peak 20b. Individual peaks such as peaks 18a, 18b, 20a, and 20b are located at discrete positions in the x-y plane adjacent to the opposing substrates 12 and 14, e.g., rather than extending in a linear manner along the y-direction. Accordingly, undulating member 16 also defines first peak 18x and 18y with corresponding second peaks not shown or labelled in FIG. 3. Supports 22x and 22y are positioned to be underlying first peaks 18x and 18y, respectively, in a manner similar to that of supports 22a and 22b. Even though supports 22x and 22y are located in the internal volume of composite 10 rather than being on an edge of composite structure 10, the processes described herein for removing supports 22 may allow for such internally located supports to be removed via a thermal and/or chemical removal process after welding of undulating member 16 to first and/or second substrate 12, 14 even though there may not be an opening in composite member 10 that allows for supports 22x and 22y to be physically removed with the size and shape of supports 22x and 22y during the welding process. Example composite sandwich structures and undulating core members of the present disclosure may include one or more of the examples described in U.S. Patent Publication 2020/0234214A1 by Straza et al., the entire content of which is incorporated herein by reference.

Figure 4:
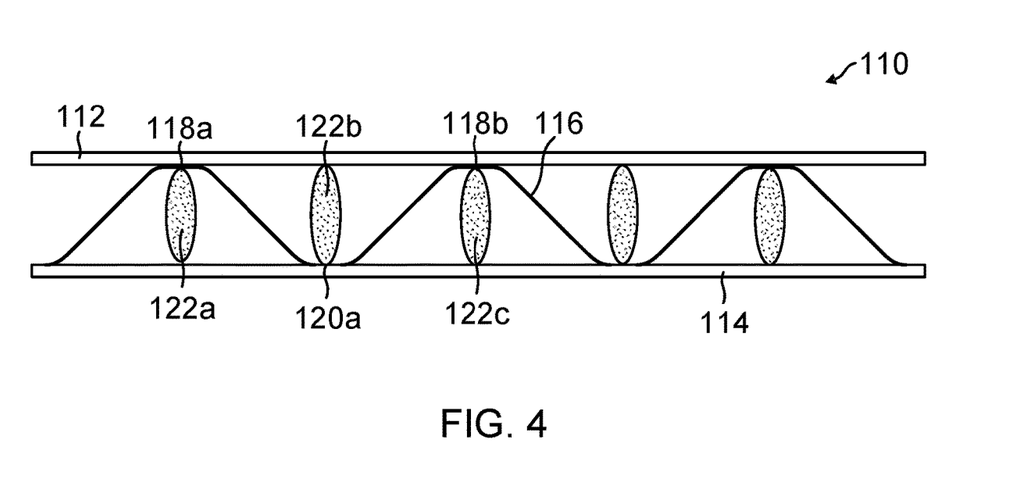
FIG. 4 is a conceptual diagram illustrating the cross-section of another example composite sandwich structure.
Figure 5:
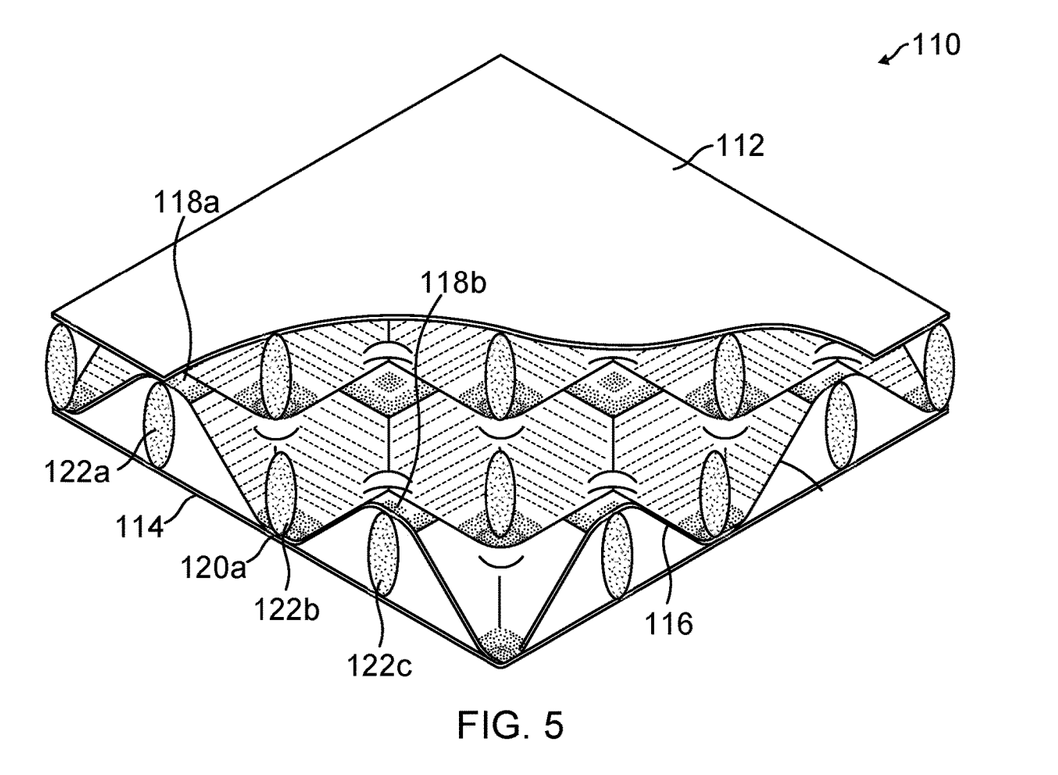
FIG. 5 is a conceptual diagram illustrating an example composite sandwich structure having a cross-section such as that shown in FIG. 4.

FIGS. 4 and 5 are conceptual diagrams illustrating another composite sandwich structure 10 in accordance with some examples of the disclosure. Composite sandwich structure 110 may be substantially similar to that of composite sandwich structure 10 and like features are similarly numbered, e.g., with first substrate 112 being the same or substantially similar to that of first substrate 12. FIG. 4 is a cross-sectional or side view of composite sandwich structure 10 and FIG. 5 is a perspective view with a portion of first substrate 112 removed to show the internal configuration and arrangement of undulating member 116 and supports 122. As was the case with composite structure 10, composite sandwich structure 110 is shown with supports 122a-122c (collectively "supports 122") positioned adjacent to peaks 118a, 120a, and 118b, respectively, of undulating member 116. Like that of FIG. 3, undulating member 116 has an egg-crate configuration with the peaks being at discrete locations opposing first and second substrate 112 and 114. However, in accordance with examples of the disclosure, supports 122 may be removed after first substrate 112 and/or second substrate 114 have been welded to undulating member 116 with supports in position to assist in the welding process. Supports 122 may be removed via a thermal and/or chemical process, such as, melting supports 122, leaching supports 122 in an acid, or electroplating supports 122 to an external location.

Unlike that of the two layer 16a and 16b structure for examples of undulating member 16 in which first peaks 18 are aligned with corresponding second peaks 20, undulating member 116 may be formed of a single layer. In such a configuration, support 122a is separated from first substrate 112 by peak 118a of undulating member 116 but extends to be directly adjacent to second substrate 114. Similarly, support 122b is separated from second substrate 114 by peak 120a of undulating member 116 but extends to be directly adjacent to first substrate 112.

Figure 2:
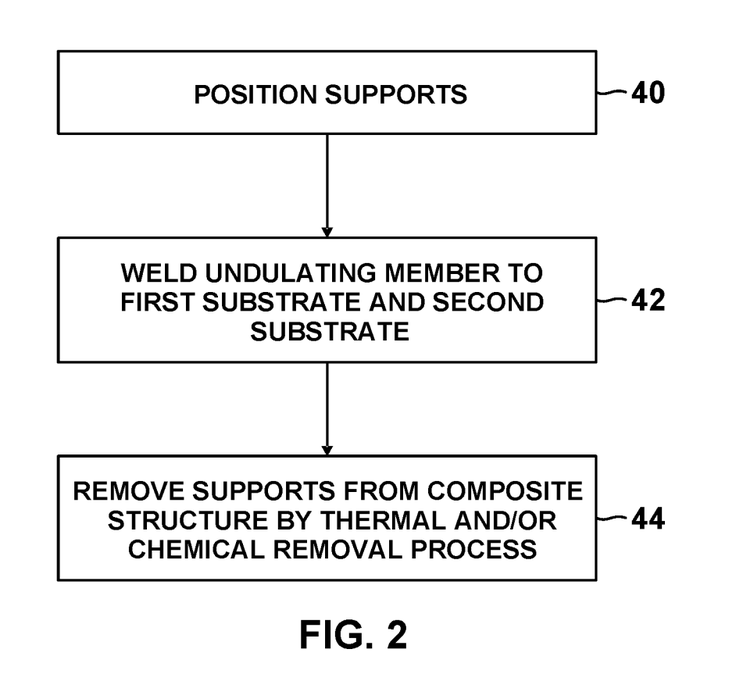
FIG. 2 is a flow diagram illustrating an example technique for forming a composite sandwich structure in accordance with the disclosure.

FIG. 2 is a flow diagram illustrating an example technique for forming a composite sandwich structure in accordance with some examples of the disclosure. For ease of description, the example of FIG. 2 is described with regard to composite structure 10 of FIGS. 1 and 3. However, such a technique may be employed to form any suitable sandwich structure in accordance with the disclosure.

As shown, supports 22 may be positioned such that supports 22 extend in gap 30 between first metallic substrate 12 and second metallic substrate 14 (40), e.g., with supports 22 being adjacent to at least one peak in undulating member 16. The arrangement shown in FIGS. 1 and 3 may be achieved using any suitable process. In the two layer configuration, undulating member 16 and sheet 16b may be positioned with supports 22 between them and welded together to capture the supports in place. First substrate 12 may then be placed over sheet 16. In some examples, second substrate 14 may define the outer surface of an existing or near net shape component and undulating member 16 and first substrate 12 may be added to the outer surface of second substrate 14 using the techniques described herein to add the functionality of the composite structure to the component, e.g., to provide heat shielding or increases stiffness and/or strength to the component.

In some examples, portion 16b of undulating member 16 may be welded or otherwise attached to second peaks 20 prior to positioning supports 22, portion 16a, and/or first substrate 12 as shown in FIGS. 1 and 3. In the example of composite structure 110, the peaks adjacent to second substrate 14 (e.g., peak 120a) may be welded or otherwise attached to second substrate 114 prior to positioning supports 22 and/or first substrate 12 as shown in FIGS. 4 and 5. In other examples, undulating member 16 and supports 22 may be combined with each other as shown in FIGS. 1 and 3 prior to positioning undulating member 16 and supports 22 adjacent to second substrate 14 and placing first substrate 12 over undulating member 16 with supports 22.

Once first and second substrates 12 and 14, undulating member 16 and supports 22 have been arranged as shown in FIGS. 1 and 3, undulating member 16 may be welded to first substrate 12 and/or second substrate in the areas adjacent to supports 22 (42), e.g., at first peaks 18 and/or second peaks 20. The welds may attach undulating member 16 to first substrate 12 and/or second substrate 14. As described herein, supports 22 may assist in the welding process. For example, as shown in FIG. 1, for a resistance welding process, supports 22 may conduct an electrical current between electrodes 26a and 26b, e.g., along path 34, the process. The conducted current and corresponding resistance may increase the temperature and melt undulating member 16 and first and/or second substrates 12, 14 in the areas of contact with each other at supports 22 to form welds upon cooling of the material. Likewise, for a laser welding, electron beam welding, resistance welding or other welding process, supports 22 may provide physical structure (e.g., as a backing) that allows for force to be applied against first and/or second substrate 12, 14, to ensure contact between undulating member 16 and first and/or second substrates 12, 14 during the welding process. For example, a clamping force may be applied through the contacting electrode, or some other clamping device that allows access for energy beam welding. In laser welding, a laser energy source or other localized energy source may apply energy to locally heat first substrate 12, second substrate 14, and/or undulating member 16 in the areas of supports 22 to melt the material in the area which cools to forms welds. In electron beam welding, a beam of high-velocity electrons may be applied in a similar fashion to the materials to be joined. First substrate 12, second substrate 14, and/or undulating member 16 may melt and flow together, which forms a weld upon cooling.

When the welding process is complete, supports 22 may be at least partially removed from the composite structure 10 by a thermal and/or chemical process (44). For example, in a thermal process, supports 22 may heat above the melting point of the material for supports 22 (e.g., a temperature that is less than that of the melting point of undulating member 16, first substrate 12 and second substrate 14) to liquify the material. The liquified material may then be allowed to flow out of the open spaces in gap 30 between first substrate 12 and second substrate 14 around undulating member 16. The heating process may be carried out using any suitable technique including, e.g., heating in a furnace. The flow of the support material may be gravity assisted or flushed with fluid or vaporized in a vacuum. The melted material of supports 22 may be able to flow through the open lattice structure between first and second substrate 12, 14 out of the sides even in cases in which support 22 in its original solid size and shape would not be able to fit though such an open lattice structure. Accordingly, supports 22 may be removed using such a thermal process even though supports 22 would not be removable from the internal volume of composite structure due to the openings in the lattice structure from the side being too small and the welds preventing access.

Additionally, or alternatively, a chemical process such as leaching or other material dissolution process may be employed to remove supports 22 after welding to remove supports. A leaching process may include dissolving supports 22 at least partially in a solvent such as an acid selected to dissolve the materials of supports 22 but not that of undulating member 16, first substrate 12 and second substrate 14. The solvent may be introduced into gap 30 between first substrate 12 and second substrate 14 around undulating member 16 though the sides of composite structure 10 and/or access ports in first and/or second substrate 12 and 14. Once the material of supports 22 is dissolved, the solvent may be washed or otherwise removed from gap 30 along with supports 22. For example, for supports 22 made of copper, a suitable acid such as nitric acid may be introduced into gap 30 to leach supports 22 and then removed to remove the acid and supports from composite structure 10. The liquid solvent and dissolved material of supports 22 may be able to flow through the open lattice structure between first and second substrate 12, 14 out of the sides even in cases in which support 22 in its original solid size and shape would not be able to fit though such an open lattice structure. Accordingly, supports 22 may be removed using such a chemical process even though supports 22 would not be removable from the internal volume of composite structure due to the openings in the lattice structure from the side being too small and the welds preventing access.

Additionally, or alternatively, a chemical process such as electroplating may be employed to remove supports 22 after welding to remove supports. For example, all or a portion of the material of supports 22 may be electroplated to another surface external to composite structure 10 by reverse plating to an external cathode.

The example technique of FIG. 2 may be employed to form a composite sandwich structure having a single undulating member, such as composite structure 110 with undulating member 116 in FIGS. 4 and 5. In such an example, the single undulating member 116 may be welded to first substrate 112 with one or more of supports 122 positioned in place. Second substrate 114 may then be placed over undulating member 116 and welded through the supports 122. After the welding is complete, supports 122 may be removed using a thermal and/or chemical removal process, such as that described above.

Additionally, composite structure having than two undulating members may be joined in the sandwich structure by using properly placed and sized supports, e.g., in a manner similar to that described above.

Each of the above processes may be employed alone or in combination with each other. In some examples, while some residual support material may remain in the composite structure 10, at least a portion may be removed (e.g., at least 50% or more, such as at least 80%, 90%, 95%, or more). In other examples, substantially all of supports 22 are removed from composite structure 10 after the welding is complete.

Composite sandwich structure 10 and 110, with supports 22 removed, may form all or a portion of high temperature gas turbine engines components, such as exhaust gas structures, engine casings, combustors, combustor casings, brackets (e.g., L-brackets), vane structures, structural heat shields, heat exchangers, and/or structures that define flight surface of an aircraft, such as wings, fins, and flight control surfaces. Composite sandwich structure 10 and 110, with supports 22 removed, may form all or a portion of a heat shielding structure of an aerospace component.

Various examples have been described. These and other examples are within the scope of the following clauses and claims.

Clause 1. A method comprising: positioning a plurality of supports such that the plurality of supports are between a first metallic substrate and a second metallic substrate, wherein an undulating member is located between the first metallic substrate and the second metallic substrate, the undulating member defining a plurality of first peaks adjacent to a first surface of the first metallic substrate and a plurality of second peaks adjacent to a second surface of the second metallic substrate, wherein a first support of the plurality of supports is positioned such that the first support extends between a first peak of the plurality of first peaks and the second surface of the second metallic substrate; welding the first peak to the first surface of the first metallic substrate in an area of the first support; and removing the first support by at least one of a thermal removal process or a chemical removal process.

Clause 2. The method of clause 1, wherein the thermal removal process comprises heating the first support to melt the first support, wherein the first support melts at a temperature below that of a melting point of the first substrate, the second substrate, and the undulating member.

Clause 3. The method of clause 1, wherein the chemical removal process includes at least one of electroplating or dissolution of the first support.

Clause 4. The method of clause 1, wherein welding the first peak to the first surface of the first substrate in the area of the first support includes resistance welding the first peak to the first surface of the first substrate by passing a current through the first support.

Clause 5. The method of clause 1, wherein welding the first peak to the first surface of the first substrate in the area of the first support includes laser welding or electron beam welding.

Clause 6. The method of clause 1, wherein the undulating member includes a first undulating member defining the plurality of first peaks adjacent to the first surface of the first substrate, and a second undulating member defining the plurality of second peaks adjacent to the second surface of the second substrate.

Clause 7. The method of clause 6, wherein positioning the first support member comprises positioning the first support member such that the first support extends between the first peak of the plurality of first peaks and a second peak of the plurality of second peaks.

Clause 8. The method of clause 7, welding the first peak to the first surface of the first substrate in an area of the first support includes welding the second peak to the second surface of the second substrate in another area of the first support.

Clause 9. The method of clause 1, further comprising welding a second peak of the plurality of second peaks to the second surface of the second substrate prior to positioning the plurality of support members between the first substrate and the second substrate.

Clause 10. The method of any one of clauses 1-9, wherein, when the undulating member is located between the first substrate and the second substrate, an internal volume is formed having an opening between the first substrate and second substrate, the support member being positioned within the internal volume during welding, and wherein a smallest dimension of the support member during welding is greater than a size of the opening.

Clause 11. The method of clause 10, wherein removing the first support by at least one of the thermal removal process or the chemical removal process comprises removing the first support through the opening by at least one of the thermal removal process or the chemical removal process.

Clause 12. The method of clause 1, wherein positioning the plurality of supports between the first substrate and the second substrate comprises positioning a second support of the plurality of supports such that the second support extends between a second peak of the plurality of second peaks and the first surface of the first substrate, the method further comprising: welding the second peak to the second surface of the second substrate in an area of the second support; and removing the second support by at least one of the thermal removal process or the chemical removal process.

Clause 13. The method of clause 1, wherein the undulating member defines an egg crate type undulating member having a plurality of discrete cells, with each respective cell corresponding to a respective peak of the plurality of peaks of the undulating member.

Clause 14. The method of clause 1, wherein the undulating member comprises a corrugated type undulating member having a plurality of linearly extending channels, with each respective channel corresponding to a respective peak of the plurality of peaks of the undulating member.

Clause 15. An article formed using the method of any one of clause 1 to 14, the article comprising the first metallic substrate, the second metallic substrate, and the undulating member between the first metallic substrate and the second metallic substrate.

Clause 16. The article of clause 15, wherein the article defining a heat shield of an aerospace component.

What is claimed is:

1. A method comprising:
positioning a plurality of supports such that the plurality of supports are between a first metallic substrate and a second metallic substrate, wherein an undulating member is located between the first metallic substrate and the second metallic substrate, the undulating member defining a plurality of first peaks adjacent to a first surface of the first metallic substrate and a plurality of second peaks adjacent to a second surface of the second metallic substrate, wherein a first support of the plurality of supports is positioned such that the first support extends between a first peak of the plurality of first peaks and the second surface of the second metallic substrate;
welding the first peak to the first surface of the first metallic substrate in an area of the first support; and
removing the first support by at least one of a thermal removal process or a chemical removal process.

2. The method of claim 1, wherein the thermal removal process comprises heating the first support to melt the first support, wherein the first support melts at a temperature below that of a melting point of the first substrate, the second substrate, and the undulating member.

3. The method of claim 1, wherein the chemical removal process includes at least one of electroplating or dissolution of the first support.

4. The method of claim 1, wherein welding the first peak to the first surface of the first substrate in the area of the first support includes resistance welding the first peak to the first surface of the first substrate by passing a current through the first support.

5. The method of claim 1, wherein welding the first peak to the first surface of the first substrate in the area of the first support includes laser welding or electron beam welding.

6. The method of claim 1, wherein the undulating member includes a first undulating member defining the plurality of first peaks adjacent to the first surface of the first substrate, and a second undulating member defining the plurality of second peaks adjacent to the second surface of the second substrate.

7. The method of claim 6, wherein positioning the first support member comprises positioning the first support member such that the first support extends between the first peak of the plurality of first peaks and a second peak of the plurality of second peaks.

8. The method of claim 7, welding the first peak to the first surface of the first substrate in an area of the first support includes welding the second peak to the second surface of the second substrate in another area of the first support.

9. The method of claim 1, further comprising welding a second peak of the plurality of second peaks to the second surface of the second substrate prior to positioning the plurality of support members between the first substrate and the second substrate.

10. The method of claim 1, wherein, when the undulating member is located between the first substrate and the second substrate, an internal volume is formed having an opening between the first substrate and second substrate, the support member being positioned within the internal volume during welding, and wherein a smallest dimension of the support member during welding is greater than a size of the opening.

11. The method of claim 10, wherein removing the first support by at least one of the thermal removal process or the chemical removal process comprises removing the first support through the opening by at least one of the thermal removal process or the chemical removal process.

12. The method of claim 1, wherein positioning the plurality of supports between the first substrate and the second substrate comprises positioning a second support of the plurality of supports such that the second support extends between a second peak of the plurality of second peaks and the first surface of the first substrate, the method further comprising:
   welding the second peak to the second surface of the second substrate in an area of the second support; and
   removing the second support by at least one of the thermal removal process or the chemical removal process.

13. The method of claim 1, wherein the undulating member defines an egg crate type undulating member having a plurality of discrete cells, with each respective cell corresponding to a respective peak of the plurality of peaks of the undulating member.

14. The method of claim 1, wherein the undulating member comprises a corrugated type undulating member having a plurality of linearly extending channels, with each respective channel corresponding to a respective peak of the plurality of peaks of the undulating member.

* * * * *